United States Patent [19]
Albou

[11] Patent Number: 6,075,327
[45] Date of Patent: Jun. 13, 2000

[54] POWER SUPPLY APPARATUS FOR A DISCHARGE LAMP, ESPECIALLY FOR A MOTOR VEHICLE HEADLIGHT

[75] Inventor: Pierre Albou, Paris, France

[73] Assignee: Valeo Vision, Bobigny Cedex, France

[21] Appl. No.: 09/276,429

[22] Filed: Mar. 25, 1999

[30] Foreign Application Priority Data

Mar. 27, 1998 [FR] France .................................. 98 03815

[51] Int. Cl.⁷ ...................................................... G05F 1/00
[52] U.S. Cl. ..................... 315/307; 315/276; 315/DIG. 5
[58] Field of Search .................... 315/307, 224, 315/244, 276, 278, 282, 289, DIG. 5, 274, 275, 277

[56] References Cited

U.S. PATENT DOCUMENTS

| | | | |
|---|---|---|---|
| 4,220,896 | 9/1980 | Paice | 315/205 |
| 4,695,771 | 9/1987 | Hallay | 315/290 |
| 5,495,405 | 2/1996 | Fujimura et al. | 363/133 |
| 5,677,602 | 10/1997 | Paul et al. | 315/224 |
| 5,726,537 | 3/1998 | Huber et al. | 315/311 |
| 5,825,139 | 10/1998 | Nuckolls et al. | 315/307 |
| 5,900,701 | 5/1999 | Guhilot et al. | 315/307 |

FOREIGN PATENT DOCUMENTS

| | | |
|---|---|---|
| 0 411 617 | 2/1991 | European Pat. Off. . |
| 0 567 408 | 10/1993 | European Pat. Off. . |
| 0 740 494 | 10/1996 | European Pat. Off. . |
| 79/00449 | 7/1979 | WIPO . |

*Primary Examiner*—Don Wong
*Assistant Examiner*—Tuyet T. Vo
*Attorney, Agent, or Firm*—Morgan & Finnegan, LLP

[57] ABSTRACT

A power supply circuit for a discharge lamp, in particular for a motor vehicle headlight, provides pulse starting. The circuit comprises a DC to AC converter giving an AC output at its secondary winding, together with a starting circuit which includes a transformer having a secondary winding in series with the discharge lamp. The apparatus further includes a branch which is connected in parallel with the secondary winding of the starter circuit transformer. At the frequency prevailing when an arc has been established in the discharge lamp, this branch has an impedance which is less than that of the secondary winding, so that the current then flows mainly in this branch.

9 Claims, 2 Drawing Sheets

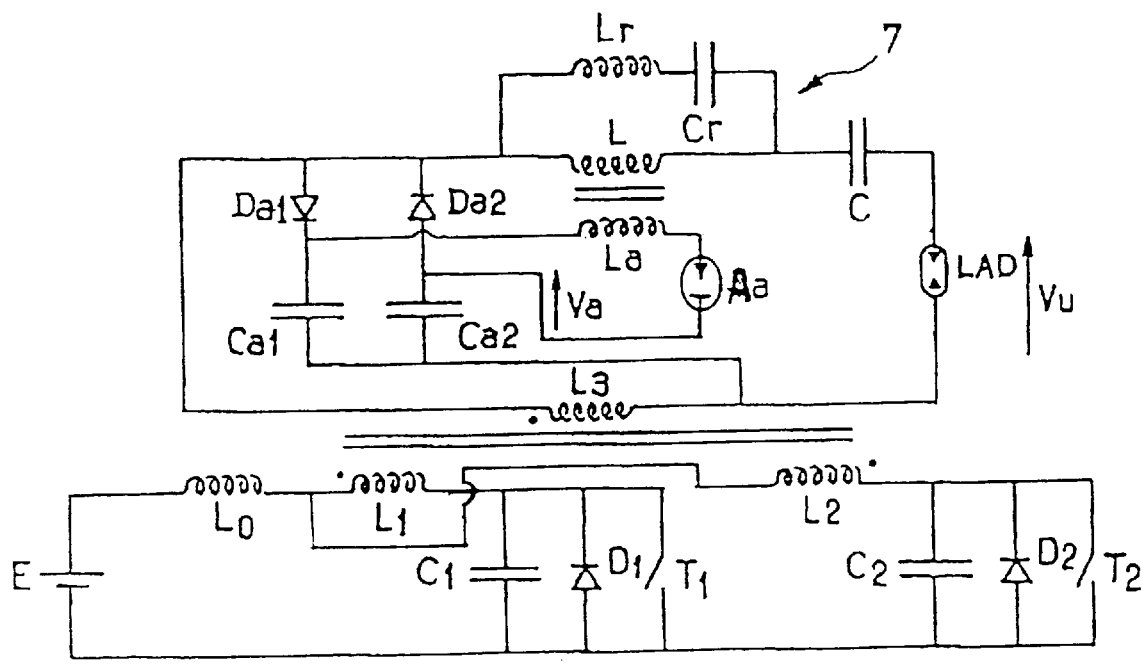
FIG_3
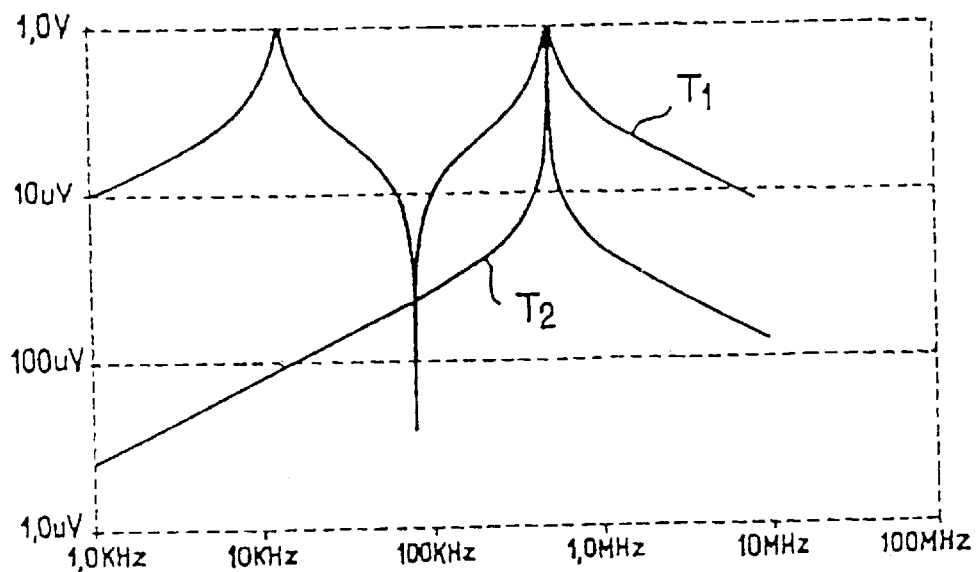
FIG_4

POWER SUPPLY APPARATUS FOR A DISCHARGE LAMP, ESPECIALLY FOR A MOTOR VEHICLE HEADLIGHT

FIELD OF THE INVENTION

The present invention relates to apparatus for supplying power to a discharge lamp, especially for a motor vehicle headlight, the apparatus being of the type to provide pulse starting for the discharge lamp.

BACKGROUND OF THE INVENTION

Conventionally, a power supply circuit for a discharge lamp, which is more usually referred to as a ballast circuit by those familiar with this technical field, comprises a converter for converting current from direct current to alternating current, together with a starting circuit for the lamp. One example of a discharge lamp power supply circuit is described in European patent specification No. 0 567 408, to which reference can with advantage be made. However, a power supply circuit of the same type is also shown in FIG. 1 of the drawings accompanying the present specification, in which the converter is indicated at 1 and the starting circuit at 2. FIG. 1 also shows a battery 3 which supplies the converter 1 with voltage, and the discharge lamp is indicated at LAD.

The converter 1 maintains the arc of the discharge lamp LAD in an active or operating mode once the lamp has been started, and after a phase of heating of its electrodes has taken place. To this end, the converter supplies an alternating current which is regulated in such a way that the power transmitted to the lamp will be substantially constant.

The function of the starting circuit 2 is to generate a high tension pulse (of the order of 12 to 25 kV) which fires the lamp and sets up the electrical arc in the latter. The starting circuit 2 generally comprises, as shown in FIG. 1, a transformer 4, the secondary winding of which, indicated at 4b, is connected in series with the discharge lamp LAD between the output terminals of the converter 1. The primary winding of the transformer 4 is indicated at 4a, and this is connected in series with a capacitor 5 and a spark gap type device 6.

The capacitor 5 becomes charged until the spark gap 6 fires to produce a spark. When this happens, the capacitor 5 discharges into the primary winding 4a of the transformer, and generates in the secondary of the latter the high tension pulse required.

In another version, it is also known to replace the spark gap device with a controlled interrupter, the capacitor 5 then being not necessarily present.

Whether the primary circuit comprises a spark gap device or a controller interrupter, the transformer of the starter circuit must be of such parameters that it permits generation of a pulse which does not have too short a duration, and it must also ensure good coupling with the secondary of the transformer. The duration of the pulse should be 50 ns or greater, in order to avoid ionization effects and electromagnetic radiation due to the high frequencies. The coupling with the secondary winding should be such that voltage losses are avoided which would otherwise impose increased load voltages on the primary winding and increase the dimensions of the spark gap device or interrupter.

For this reason, the windings of the primary and the secondary have a large number of turns, so that the inductance in the secondary of the starter circuit is generally high, being in particular of the order of 1 mH or higher.

Such an inductance is also acceptable in the case where, when an arc is in operation in the discharge lamp, the alternating current transmitted to the lamp has a nominal frequency of the order of a few kilohertz.

On the other hand, at higher frequencies, which are desirable in particular so as to enable the dimensions of transformers used in the converters to be reduced, this reactive impedance has a voltage dividing effect across the terminals of the discharge lamp. This calls for an increase in the voltage at the output of the converter, and therefore requires the converter to be made larger in size. In addition, the high frequency current that flows through the inductance of the secondary is then the source of major losses in the transformer.

DISCUSSION OF THE INVENTION

An object of the invention is accordingly to overcome these drawbacks, and to provide an apparatus for the power supply of a discharge lamp which has pulse starting and which is also of reduced cost and size. One possible solution (still with reference to FIG. 1) could consist of arranging in series with the inductance of the secondary winding, a capacitor which is so selected that at the fundamental frequency of the current delivered by the converter 1, the impedance of the capacitor compensates for that of the inductance, this fundamental frequency being the resonant frequency of the assembly consisting of the capacitor and inductance. However, this solution is not satisfactory, because it involves choosing a capacitor of low capacity and therefore a high quality factor for the resonant circuit. For a given value of the converter output voltage, the voltage across the discharge lamp then decreases very sharply on either side of the resonant frequency, and this makes operation hard to control. In this connection see the curve indicated at $T_2$ in FIG. 4.

According to the invention, power supply apparatus for a discharge lamp, especially for a motor vehicle headlight, of the type having pulse starting and including a converter for converting direct current to alternating current, together with a starting device which comprises a transformer, a secondary winding of which is adapted to be connected in series with the discharge lamp across the output of the converter, is characterised in that the apparatus further includes a branch which is connected in parallel on the said secondary winding, and which, at the frequency prevailing when the arc of the lamp is operating, has an impedance lower than that of the said winding, so that the current then flows mainly in the said branch.

Preferably, the said branch includes inductive means and capacitive means.

According to a preferred feature of the invention, the apparatus also includes further capacitive means connected in series with the assembly that consists of, firstly, the discharge lamp and secondly, the said secondary winding and the branch connected in parallel with the latter.

In preferred embodiments of the invention having either of the last mentioned two features, the inductance and capacitance of the said capacitive and inductive means respectively are so chosen that the frequency of the current when the arc of the lamp is operating corresponds to the resonant frequency of the assembly coupled to the output of the converter.

Preferably, the frequency of the current when the arc of the lamp is operating is of the order of 1 MHz.

Further features and advantages of the invention will appear more clearly on a reading of the following detailed description of some preferred embodiments of the invention, which is given by way of non-limiting example only and with reference to the accompanying drawings.

BRIEF DESCRIPTION OF THE DRAWINGS

FIG. 3 is a diagram of one possible practical embodiment of the apparatus shown in FIG. 2.

FIG. 4 is a graph on which the variation in the voltage applied to the discharge lamp is plotted as a function of the frequency of the current delivered by the converter.

DESCRIPTION OF PREFERRED EMBODIMENTS OF THE INVENTION

Figure 1:
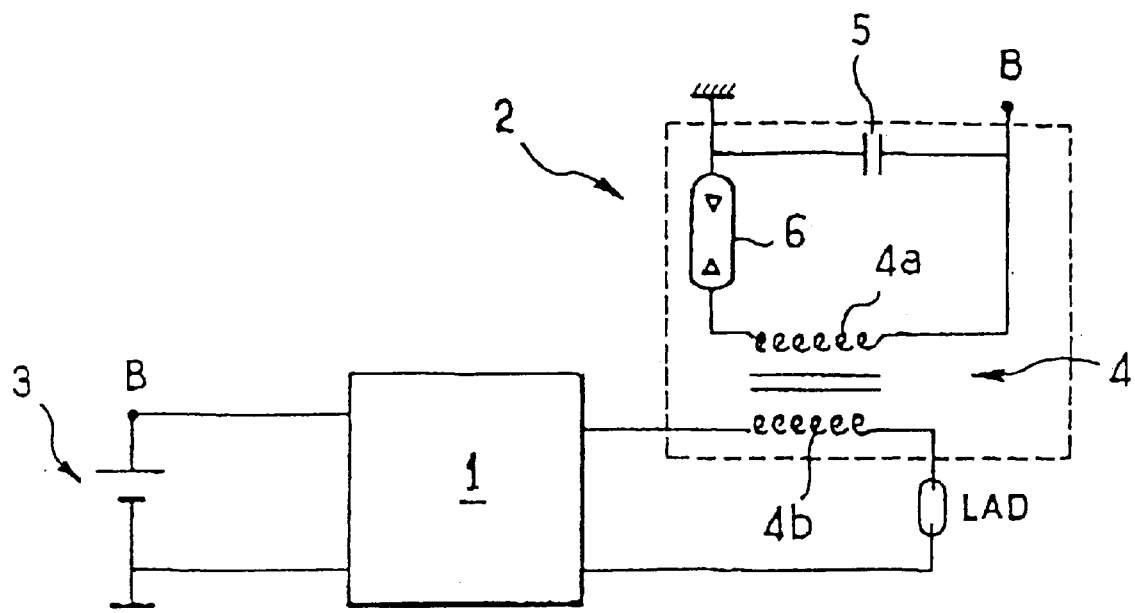
FIG. 1, already discussed above, is a diagrammatic representation showing a power supply Circuit for a discharge lamp, in a form already known in the prior art.
Figure 2:
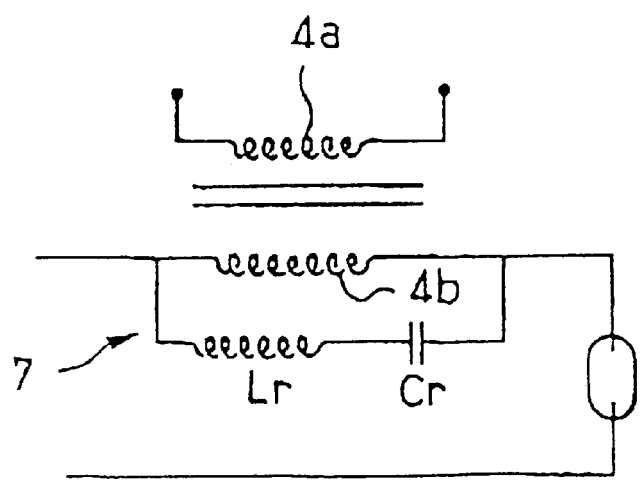
FIG. 2 is a diagram illustrating the principle of the invention.

In the example shown in FIG. 2, which merely shows the principle of the invention, a branch 7, which is connected across the secondary winding 4b, comprises an inductance Lr and a capacitor Cr in series with each other. The inductive and capacitive values, respectively, of these two elements are so selected that at the fundamental frequency of the current delivered by the converter 1 during the active phase of the arc of the lamp LAD, the impedance of the branch 7 is very low as compared with that of the winding 4b. For example, these values are so chosen that the fundamental frequency corresponds to the resonant frequency of the branch 7.

Thus, during the active phase of the arc, i.e. when an arc is operating in the lamp, the current at the fundamental frequency no longer flows in the secondary winding 4b, but instead flows in the branch 7. All of the output voltage from the converter 1 is applied to the discharge lamp LAD, and no losses take place within the transformer 4.

One detailed example of a practical embodiment of a power supply apparatus in accordance with the invention is shown in FIG. 3. In this version, the converter 1 is a push-pull circuit which is supplied from a source E of direct current voltage, which is for example a battery. The circuit includes a primary which includes, in series with the terminals of the DC source E, an inductance L0, a first primary winding L1 and a sub-circuit which comprises, in parallel with each other, a capacitor C1, a diode D1 and an interrupter which consists of a transistor T1. The transistor T1 is for example of the Mosfet type. The diode D1 is "passing" from the source E towards the primary winding L1. The DC source E polarises the diode D1 inversely. This diode is generally the intrinsic diode of the Mosfet transistor T1.

This sub-circuit is also connected in parallel with a second primary winding L2, which is in series with a second sub-circuit. This second sub-circuit comprises, in parallel with each other, a capacitor C2, a diode D2 and an interrupter consisting of a transistor T2. The diode D2 is "passing" from the source E towards the primary winding L2.

The windings L1 and L2 are coupled by mutual induction to a secondary winding L3, and a voltage doubler is connected across the terminals of the winding L3. The voltage doubler consists of two diodes Da1 and Da2, together with two capacitors Ca1 and Ca2.

The anode of the diode Da1 and the cathode of the diode Da2 are connected to a common end of the winding L3. The capacitors Ca1 and Ca2 are, respectively, connected between, firstly, the other end of the secondary winding L3, and secondly the cathode of the diode Da1 and the anode of the diode Da2. The primary of the starting circuit is connected between the common point of the diode Da1 and capacitor Ca1 and the common point between the diode Da2 and the capacitor Ca2. In FIG. 3, this primary comprises a winding La in series with a spark gap Aa. The winding La, which corresponds to the secondary winding 4b shown in FIG. 2, is coupled inductively to a secondary winding L corresponding to the winding 4b, which is connected between the point common to the diodes Da1 and Da2 and a capacitor C. The capacitor C is itself connected to the discharge lamp LAD. The discharge lamp is connected at its other end to the point common to the capacitors Ca1 and Ca2. A branch 7, corresponding to the branch 7 in FIG. 2 and comprising an inductance Lr and a capacitance Cr, is connected in parallel on the secondary winding L.

The operation of the apparatus described above with reference to FIG. 3 is as follows. The combination of the two capacitors Ca1, Ca2 with the inductive winding La and the spark gap Aa constitutes a pulse generator which generates pulses by capacitor discharge. It operates in an entirely conventional way, and its influence is limited to the starting pulse for the lamp LAD.

Also, the full wave rectifier constituted by the combination of the components Da1, Ca1, Da2 and Ca2 has a negligible influence when the apparatus is established in its running mode, especially during the active phase of the arc in the lamp. During this active phase, the current passes at its fundamental frequency through the branch 7.

As is illustrated in FIG. 4, it will be noted that with such a circuit, it is possible to choose the values of the inductance Lr and the capacitance, Cr and the value of the capacitance C, in such a way that the variations in voltage across the discharge lamp LAD are less pronounced than in the case of a resonance which is obtained solely by means of a capacitor in series with the secondary winding L and the discharge lamp LAD.

In FIG. 4, the curve T1 represents a function of the transmission frequency (vu/vs, where vu is the voltage across the discharge lamp, and vs is the output voltage of the converter), where C=150 nF, Lr=25 $\mu$H, and Cr 4 nF.

The curve T2 shows, as a function of the frequency, the transmittance in the case where the branch 7 is absent, and where C has a value of 0.1 nF.

It will also be noted that the branch 7 may consist of other components than a circuit consisting of an inductor and a capacitor in series. It is sufficient that at the working frequency, the impedance of the branch 7 is very low as compared with that of the winding L. Thus for example the capacitor Cr may be omitted.

However, a structure with a capacitor and an inductance is preferred for the branch 7, because it provides a function of filtering the current delivered to the discharge lamp LAD. This filtering function is desirable for electromagnetic radiation emitted by the discharge lamp.

In the same way, the capacitor C is optional, but it is nevertheless of advantage to include it. This is particularly so in the case where a starting pulse is not sufficiently large to fire the lamp LAD, in which the recoil pulse that follows the starting pulse charges up the capacitor C. Once this has happened, the capacitor C then provides a boost for starting the discharge lamp LAD when a new starting pulse is delivered.

The various components of the circuit shown in FIG. 3 may for example, and preferably do, have the following values:

battery voltage: 12 V

L0: 1 uH

L1: 10 uH

C1: 1 nF

L2: 10 uH

C2: 1 nF

L3: 325 uH transformer ratio of L1/L3 and L2/L3: 5.7

La: 1 mH

C: 0.52 nF

Lr: 0.1 mH

Cr: 0.52 nF.

As will be understood, the circuit described above has numerous advantages. For example, it permits high frequency operation with low switching losses and low flux in the transformer. It also enables passive components of small dimensions to be used. Again, it enables the line current to be filtered.

Yet another advantage is that the arrangement only requires a few power transistors, and it consequently avoids problems which can arise in complex and fragile floating control units. In addition, the arrangement enables the lamp to be started by condenser discharge, which does not require high supply currents.

In the example which has been described above, the converter is of the push-pull type. However, other types of converter can of course be envisaged, for example converters of the quasi-resonant half bridge type, or converters of the so-called flyback type.

What is claimed is:

1. A power supply circuit for a discharge lamp with a pulse-type starting facility, the circuit comprising:

a direct current source;

a converter connected the source for converting direct current to alternating current;

a starting device coupled to the converter for receiving alternating current from the converter; and the discharge lamp, the starting device including a transformer having a secondary winding connected in series with the discharge lamp and across the output of the converter, wherein the circuit further includes a branch connected in parallel with the secondary winding and connected in series with the discharge lamp, wherein the branch comprises inductive means and capacitive means, the secondary winding having a first impedance, and the branch having a second impedance which is lower than said first impedance at a frequency prevailing when an arc is operating in the lamp, wherein the current then flows mainly in the branch.

2. A power supply circuit for a discharge lamp with a pulse-type starting facility, the circuit comprising: a direct current source; a converter connected to the source for converting direct current to alternating current; a starting device coupled to the converter for receiving alternating current from the converter; and the discharge lamp, the starting device including a transformer having a secondary winding connected in series with the discharge lamp and across the output of the converter, wherein the circuit further includes a branch connected in parallel with the secondary winding, the secondary winding having a first impedance, and the branch having a second impedance which is lower than said first impedance at a frequency prevailing when an arc is operating in the lamp, wherein the current then flows mainly in the branch.

3. A circuit according to claim 1, wherein the said branch comprises inductive means and capacitive means.

4. A circuit according to claim 1, further comprising second capacitive means connected in series with the discharge lamp and the secondary winding.

5. A circuit according to claim 1, wherein the values of the inductance and capacitance of the capacitive and inductive means are chosen respectively so that the frequency of the current prevailing when said arc is operating corresponds to the resonant frequency of the circuit on the output side of the converter.

6. A circuit according to claim 5, wherein the frequency of the current when said arc is operating is of the order of 1 MHz.

7. A circuit according to claim 6, wherein the inductive means in the branch in parallel with the secondary winding have an inductance of the order of 0.1 mH.

8. A circuit according to claim 6, wherein the capacitive means in the branch in parallel with the said secondary winding has a capacitance of the order of 0.52 nF.

9. A circuit according to claim 5, further comprising second capacitive means connected in series with the discharge lamp and the secondary winding, wherein the further capacitive means has a capacitance of the order of 0.52 nF.

* * * * *

UNITED STATES PATENT AND TRADEMARK OFFICE
CERTIFICATE OF CORRECTION

PATENT NO.    :    6,075,327

DATED         :    June 13, 2000

INVENTOR(S)   :    Pierre Albou

It is certified that error appears in the above-identified patent and that said Letters Patent is hereby corrected as shown below:

Claim 1, line 4, after the word "connected," insert -- to --.

Signed and Sealed this

Twenty-seventh Day of March, 2001

*Attest:*

NICHOLAS P. GODICI

*Attesting Officer*    *Acting Director of the United States Patent and Trademark Office*